Dec. 22, 1925.
S. B. HASELTINE
1,566,276
FRICTION SHOCK ABSORBING MECHANISM
Filed Dec. 22, 1922    2 Sheets-Sheet 1
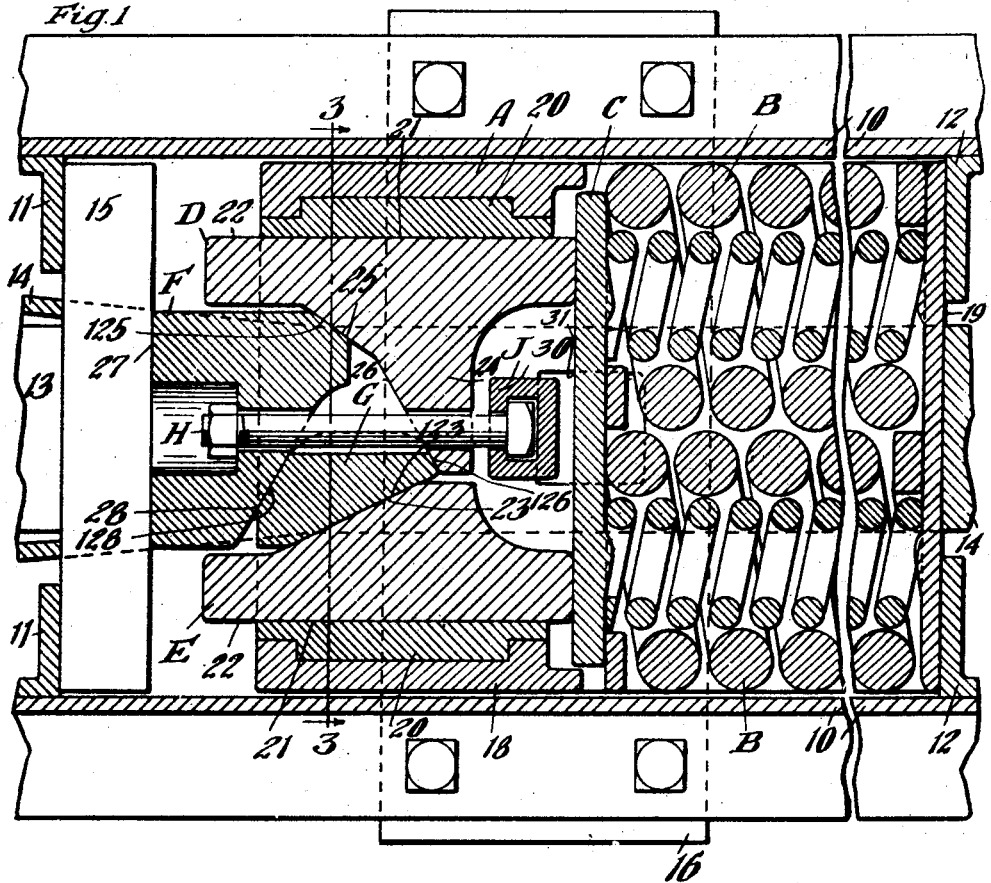
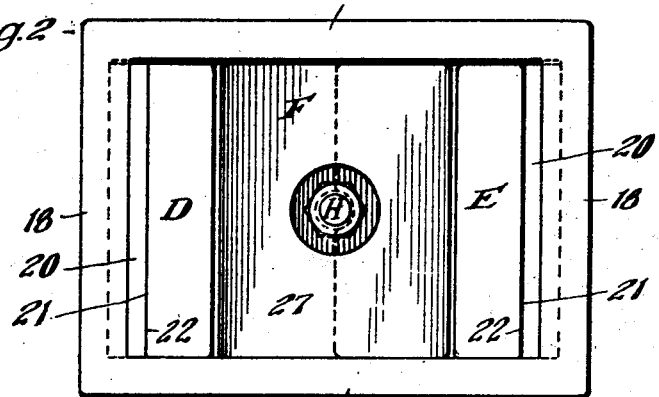
Witnesses
Wm. Geiger
Inventor
Stacy B. Haseltine
By Geo. F. Haight
His Atty.

Dec. 22, 1925.
S. B. HASELTINE
1,566,276
FRICTION SHOCK ABSORBING MECHANISM
Filed Dec. 22, 1922
2 Sheets-Sheet 2
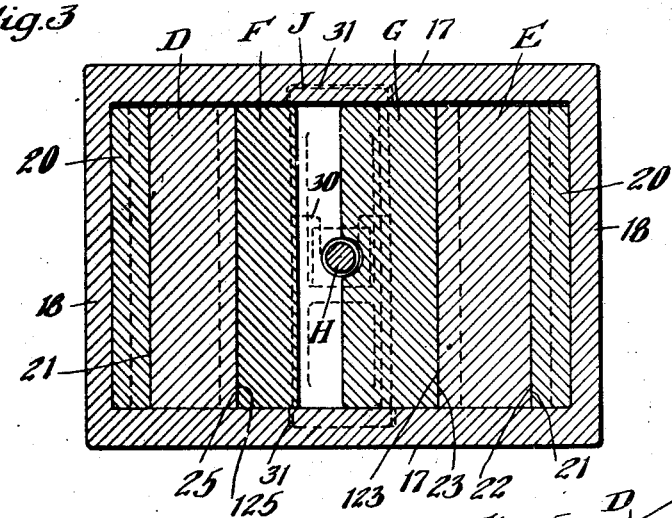
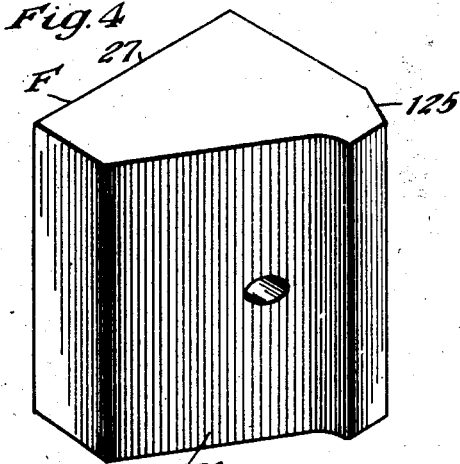
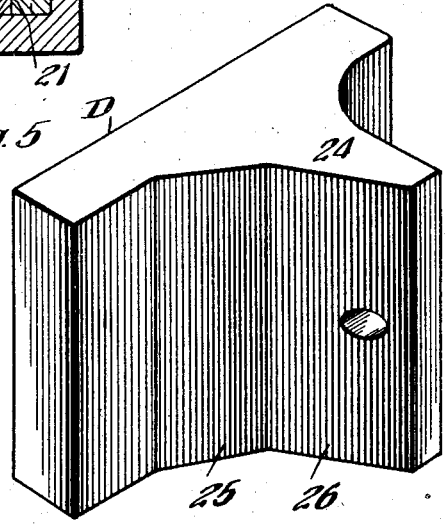
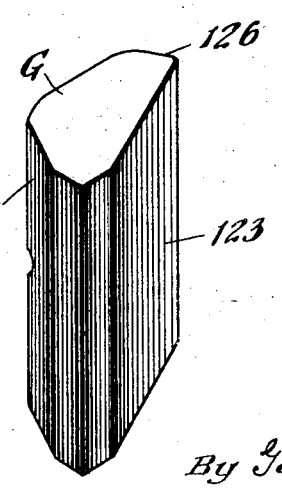
Witnesses
Wm. Geiger
Inventor
Stacy B. Haseltine
By Geo. F. Haight
his Atty.

Patented Dec. 22, 1925.

1,566,276

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 22, 1922. Serial No. 608,422.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein are obtained high capacity and certain release and, more specifically, an arrangement wherein the high capacity is obtained primarily by one set of wedge faces and the release is insured by a different set of inclined faces.

More specifically, an object of the invention is to provide, in a mechanism of the character indicated, means for distributing the pressure efficiency throughout the length of the friction shoes.

In the drawings forming a part of this specification, Fig. 1 is a horizontal longitudinal sectional view of a portion of a railway draft rigging showing my improvements in connection therewith, parts being broken away in order to better accommodate the figure on the sheet. Fig. 2 is a front end elevation of the shock absorbing mechanism proper. Fig. 3 is a vertical transverse sectional view of the shock absorbing mechanism proper corresponding substantially to the line 3—3 of Fig. 1. And Figures 4, 5 and 6 are detailed perspectives of one of the pressure transmitting elements, one of the friction shoes, and the other of the pressure transmitting elements, respectively.

In said drawings, 10—10 denote the usual channel draft sills of a car underframe to the inner faces of which are secured front stop lugs 11 and rear stop lugs 12. A portion of a draw bar is indicated at 13, the same being operatively associated with the shock absorbing mechanism proper by a hooded cast yoke 14 within which is disposed the shock absorbing mechanism proper and a front follower 15. The yoke and parts therewithin are supported in operative position by a detachable saddle plate 16.

The improved shock absorbing mechanism proper, as shown, comprises, broadly, a combined friction shell and spring cage casting A; twin arranged springs B—B; a spring follower C; two friction shoes D and E; an outer wedge pressure transmitting member F; an inner wedge pressure transmitting member G; a retainer bolt H; and an anchor bar J.

The casting A, as shown, is of rectangular cross section having top and bottom walls 17—17, side walls 18—18 and vertical rear wall 19 integrally formed with the top and bottom walls 17. The rear wall 19 functions as a rear follower in conjunction with the stop lugs 12. The side walls 18 are relatively short so as to leave the major portion of the sides of the casting A open to admit of the insertion and removal of the springs and other parts. Preferably, the inner faces of the side walls 18 are provided with detachable renewable hardened liners 20—20, the latter having longitudinally extending friction surfaces 21 on their inner faces.

The two friction shoes D and E are of different construction but each is provided on its outer side with a longitudinally extending flat friction surface 22 co-operable with the corresponding adjacent friction surface 21 of the shell. At their inner ends, the shoes D and E bear upon the spring follower C which in turn bears upon the forward ends of the twin arranged springs B—B.

The friction shoe E is formed on its inner side with an enlargement having a rearwardly and inwardly inclined wedge face 23 which extends at a relatively acute and true wedging angle with respect to the axis of the mechanism and actuating forces applied parallel or approximately parallel thereto. The other friction shoe D has a laterally inwardly extending enlargement 24 which passes beyond the center line of the mechanism and is perforated to accommodate the retainer bolt H, as clearly shown in Fig. 1. Said lateral enlargement 24, near the outer end thereof is provided with a surface 25 which is inclined rearwardly and toward the axis of the mechanism at a relatively keen and true wedging angle with respect to the axis of the mechanism when force is applied parallel or substantially parallel thereto. In practice, the angle of inclination of the faces 25 and 23 will preferably be the same. Inwardly of the true wedge face 25, the enlargement 24 is provided with another inclined face 26 which passes across the center line of the mechanism and is extended at a relatively blunt, substantially non-wedging angle with respect to the axis of the mechanism and forces applied parallel or approximately parallel thereto, for the purpose hereinafter described.

The outer wedge pressure transmitting member F has an outer flat face 27 in contact with the front follower 15. Near its inner end and on the side adjacent the shoe D, the said member F is provided with an inclined wedge face 125 corresponding in angle to and co-operable with the wedge face 25 of the shoe D. To the other side of the center of the member F, the latter is provided with an inclined face 28 which is arranged at a relatively blunt angle with respect to the axis of the mechanism. Said blunt angled face 28 engages and co-operates with a correspondingly inclined face 128 formed on the front end of the other wedge elements G. The latter, on its outer side, is provided with a face 123 inclined at the same angle as and cooperable with the wedge face 23 of the shoe E. At its inner end, the member G is provided with still another inclined face 126 extending at the same angle as and cooperable with the blunt angle face 26 of the shoe D.

The retainer bolt H is anchored at its outer end within the wedge member F and at its inner end is hooked beneath a slotted flange 30 (see Fig. 3) formed on the forward side of the vertically extending anchor bar J. The latter has its ends received in longitudinally arranged grooves 31 provided on the inner sides of the top and bottom walls of the casting A, it being understood that the anchor bar J is limited in its outward movement to the position shown in Fig. 1, but is free to move inwardly during the compression stroke. With this arrangement not only may all of the parts be held in assembled position but also the spring may be placed under initial compression.

During a compression stroke, and assuming an inward movement of the draw bar, the operation of the mechanism is substantially as follows. As the wedge member F is forced inwardly of the shell, a true wedging action is set up on the keen angle faces 23 and 123 of the shoe E and member G, respectively, the members F, G and D traveling inwardly substantially as a solid unit. In this manner, it will be obvious that I obtain high capacity due to the keen angles of the faces 23 and 123. It will also be noted that the lateral pressure to the shoe D is distributed to the latter at two points on the faces 25 and 26 from the elements F and G, respectively.

While the action which I have just described will ordinarily occur where angles are employed as shown in the drawing, slight variations in the angles of any one of the sets of cooperating faces may produce slightly different action and another factor which may affect the action somewhat is the co-efficient of elasticity of the friction shell. In any event, however, the primary wedge action takes place on the keen angle faces 23 and 123.

Upon removal of the actuating forces, due to the blunt angle and engaging faces 28 and 128, the outer wedge member F is free to fall away from the shoe D without danger of sticking to the latter, it being observed that the included angle between the wedge face 25 and the inclined face 28 is comparatively blunt, and of true releasing character. The action just described obviously permits collapse of the spreading means consisting of the two members F and G so that the member G is thereafter free to release itself with respect to the shoes E and D. With the wedge system collapsed as above described, the parts may readily be projected forwardly to their normal full release position.

I have herein shown and described what I now consider the preferred manner of carrying out the invention, but the same is merely illustrative and I contemplate all changes and modifications that come within the scope of the claims appended hereto.

I claim:—

1. In a friction shock absorbing mechanism, the combination with a friction shell having interior longitudinally extending friction surfaces; of friction shoes co-operable with said shell; a spring resistance; and a multiple part wedge co-operable with the shoes, the parts of said wedge having relatively keen angle wedging engagement with the shoes and blunt angle engagement with each other permitting collapse of the wedge during release, one of said parts of the wedge having also a different angle engagement with a shoe opposed to that shoe with which said part has keen angle wedge engagement.

2. In a friction shock absorbing mechanism, the combination with a friction shell having a pair of interior opposed longitudinally extending friction surfaces; of a pair of friction shoes co-operable with the surfaces of said shell; a spring resistance; and a multiple part wedge co-operable with said shoes, the parts of said wedge having relatively keen angle wedging engagement with the shoes and blunt releasing angle engagement with each other, one of said wedge parts having also a different angle engagement with the shoe opposed to the one with which it has keen angle wedge engagement.

3. In a friction shock absorbing mechanism, the combination with a member having longitudinally extending friction surfaces; of friction shoes slidable upon said friction surfaces; a spring resistance; and a multiple part combined pressure transmitting and wedge acting member, said pressure and wedge acting member and the shoes having engaging faces extending at one angle relative to the axis of the mechanism and the parts of said combined pressure and wedge acting member having co-operating engaging faces extending at a different angle with respect to the axis of the mechanism, one of said sets of faces being wedge acting and the other set substantially non-wedge acting under actuating forces applied substantially parallel to the axis of the mechanism during a compression stroke, one of said shoes being engaged by all the parts of said multiple part combined pressure and wedge acting member.

4. In a friction shock absorbing mechanism, the combination with a friction shell having interior longitudinally extending friction surfaces; of opposed friction shoes co-operable with said shell; a spring resistance; and a multiple part wedge co-operable with the shoes, one of said wedge parts having keen angle engagement with one shoe, another of said wedge parts having blunt angle engagement with said shoe and keen angle engagement with an opposed shoe, the wedge parts having blunt angle engagement with each other.

5. In a friction shock absorbing mechanism, the combination with a friction shell having interior longitudinally extending friction surfaces; of friction shoes co-operable with said shell; a spring resistance; and a multiple part wedge co-operable with the shoes, the parts of said wedge having relatively keen angle wedging engagement with the shoes and blunt angle engagement with each other permitting collapse of the wedge during release, one of said parts of the wedge having also a different angle engagement with a shoe opposed to that shoe with which said part has keen angle wedge engagement; and a spring follower interposed between the inner ends of said shoes and the spring resistance.

6. In a friction shock absorbing mechanism, the combination with a friction shell; of a spring resistance; and a friction unit frictionally co-operable with the shell, said unit including a plurality of parts with three sets of transversely opposed co-operating faces all inclined relatively to the axis of the shell, two of said sets of faces extending at a keen wedging angle with respect to applied actuating forces and the other set at a readily releasing angle, the latter rendering the keen angle faces effective in creating frictional capacity, one of said parts having engagement with all the remaining parts of the friction unit.

7. In a friction shock absorbing mechanism, the combination with a friction member provided with longitudinally extending friction surfaces; of a spring resistance; friction shoes co-operable with said member; and a multiple part pressure transmitting wedging device, said device having parts thereof engaging said shoes on faces inclined at a keen wedging angle with respect to the line of applied compression forces, parts of said device having also co-acting faces inclined at a different more obtuse and releasing angle, all of said faces being transversely opposed, one of said parts of the device having engagement with every other part of the friction system.

8. In a friction shock absorbing mechanism, the combination with a friction shell; of a main follower; a spring resistance; and a friction unit frictionally cooperable with the shell, said unit including a plurality of parts comprising a plurality of friction shoe parts, a main wedge part engaging said follower, and a wedge part interposed between said shoes and main wedge part, said parts having cooperating faces, and one of said parts having engagement with all of the remaining parts.

9. In a friction shock absorbing mechanism, the combination with a friction shell; of a spring resistance; a friction unit frictionally cooperable with the shell, said unit comprising a plurality of parts having co-operable faces, including a pair of friction shoe-acting parts, and a pair of wedge-acting parts, one of said parts having engagement with all of the remaining parts.

In witness that I claim the foregoing I have hereunto subscribed my name this 16th day of Oct. 1922.

STACY B. HASELTINE.